United States Patent [19]

Doucet

[11] Patent Number: 5,464,066
[45] Date of Patent: Nov. 7, 1995

[54] METHOD AND A MACHINE FOR REPAIRING A GROUND AREA PLANTED WITH GRASS FOR EXAMPLE A TURFED RACECOURSE OR EQUESTRIAN TRAINING GROUND

[75] Inventor: Bernard Doucet, Montmirail, France

[73] Assignee: Doucet Freres, France

[21] Appl. No.: 29,158

[22] Filed: Mar. 10, 1993

[30] Foreign Application Priority Data

Mar. 11, 1992 [FR] France .................... 92 02895

[51] Int. Cl.⁶ .................... E02F 3/76; E01C 19/00
[52] U.S. Cl. .................... 172/1; 172/123; 172/184; 404/103
[58] Field of Search .................... 404/84.05, 103, 404/90; 172/123, 1, 4.5, 184, 135; 171/9, 49

[56] References Cited

U.S. PATENT DOCUMENTS

| | | | |
|---|---|---|---|
| 335,966 | 2/1886 | Shaw | 404/90 X |
| 1,632,969 | 6/1927 | Horner et al. | 404/90 |
| 2,706,881 | 4/1955 | McDonald | |
| 3,041,945 | 7/1962 | McKinney | 404/103 |
| 4,155,315 | 5/1979 | Dobbins | 172/184 X |
| 5,076,367 | 12/1991 | Reincke | 172/123 |

FOREIGN PATENT DOCUMENTS

| | | |
|---|---|---|
| 292722 | 7/1969 | Australia . |
| 869331 | 11/1978 | Belgium . |
| 2414592 | 8/1979 | France . |
| 2669046 | 5/1992 | France .................... 404/84.05 |
| 9006763 | 8/1991 | Germany . |
| 4106205 | 4/1992 | Japan .................... 404/84.05 |
| 353393 | 6/1961 | Switzerland . |
| 2766632 | 5/1986 | United Kingdom . |

*Primary Examiner*—David H. Corbin
*Assistant Examiner*—Christopher J. Novosad
*Attorney, Agent, or Firm*—Remy J. VanOphem; John VanOphem

[57] ABSTRACT

A method and apparatus for filling holes which have been made in the ground, by causing a machine which includes a rotary rake at its extreme front end to pass over the ground. In the case in which the ground area planted with grass is a racecourse or equestrian training ground, the machine is preferably driven over the course in a direction opposite to the direction in which the horses have been moving, the rotary rake being driven so as to rotate with a forward velocity tangential to the ground. The machine also includes a soil consolidating device disposed behind the rotary rake to tamp the soil which is replaced in the holes by the rake so that the soil will remain in place.

21 Claims, 9 Drawing Sheets

METHOD AND A MACHINE FOR REPAIRING A GROUND AREA PLANTED WITH GRASS FOR EXAMPLE A TURFED RACECOURSE OR EQUESTRIAN TRAINING GROUND

BACKGROUND OF THE INVENTION

The present invention relates to the repair of ground areas planted with grass.

If a turfed racecourse or equestrian training ground is considered by way of example, it is well known that after a number of races have taken place, or after a training session, the turf is found to have been damaged by the horses' hooves, which will have made holes in the turf.

In order to restore the condition of the racecourse or training ground (referred to herein, for convenience, as "the course"), it is usual to employ ten, fifteen or even twenty people for repairing the holes, each person being provided with a tool in the form of a long-handled hook, known as a hoe or mattock.

The present invention aims to make this type of operation faster to carry out.

SUMMARY OF THE INVENTION

To this end, the invention proposes a method of repairing a ground area planted with grass, wherein holes which have been made therein are filled by causing a machine, embodying a rotary rake at its extreme front end, to pass over the ground area.

By virtue of the rake, the soil that has been displaced from the ground is replaced in the holes in the ground area. The fact that the rotary rake is arranged at the extreme front end of the machine enables it to operate on the ground while the ground is still easy to rake because it has not yet been compressed by a wheel or the like. If the soil had been compressed, then it would have become attached to the blades of the grass on which it has been compressed.

The method in accordance with the invention is much faster than the above mentioned method of repair, and it is for example possible with this method to repair the running track of an equestrian racecourse in two to four hours using only one person, instead of one or two days with at least ten people.

The invention is applicable to any kind of grass covered ground, for example, a golf course, a polo field, a football or rugby pitch, a grass tennis court, or even spaces which are not intended for sporting purposes, for example a prairie or pasture, or a lawn.

However, the invention aims more particularly to provide a method of repairing the turf of a racecourse or equestrian training ground. The method is accordingly preferably characterized in that holes which have been made in the turf by the horses are filled by a machine which has a rotary rake at its extreme front end, the rake being driven so as to rotate with a forward velocity tangential to the ground, by causing the machine to travel over the course in a direction opposite to that in which the horses have passed.

It has been found that horses' hooves make holes in the ground by raising or projecting forwardly a tongue of turf, or divot, which often becomes completely detached from the ground. The work of the rake will, therefore, be particularly effective if it travels in the direction opposite to the direction in which the horses have passed, because it replaces severed divots in the holes, and bends back into position those divots which have remained attached. Since the rake works in the direction that replaces the divots in the holes, the direction of rotation of the rake is chosen so that it may carry out the operation of replacing divots under the best possible conditions based upon the predetermined direction of travel taken by the machine.

The invention further provides a method of repairing the turf of a racecourse or equestrian training ground, characterized in that the holes made by the horses are filled by a machine which has a rotary rake at its extreme front end. The rake is driven so as to rotate with a rearward velocity tangential to the ground, by causing the machine to travel over the course in the same direction as that in which the horses have passed.

The holes are thus filled by the rake in a somewhat similar way to that which is performed by personnel equipped with mattocks in the prior art, replacing the soil in the holes by applying the hook of the mattock to the hole while moving over the course in the same direction as that traversed by the horses. The result which is obtained is satisfactory, without being as good as that obtained with the method described above according to the present invention. It should be noted in both methods of the present invention disclosed above, there is the step of determining the direction of travel of the machine with respect to the ground. The direction of travel is preferably determined to be either opposite to that of the horses, with the rotary rake having a velocity tangential to the ground in the same direction as the direction of travel of the machine, or the direction of travel of the machine is the same as that of the horses, with the rotary rake having a velocity tangential to the ground in a direction opposite to the direction of travel of the machine.

The present invention also proposes a machine which is suitable for carrying out the methods described above.

To this end, the invention proposes a machine for repairing a ground area planted with grass, characterized in that it is adapted to travel over the ground area for the purpose of filling holes which have been formed therein, and in that it includes for this purpose a rotary rake arranged at the extreme front end of the machine and a ground consolidating device disposed behind the rotary rake.

The soil which is replaced in the holes by the rake is then subsequently tamped by the consolidating device so that it will remain in place.

According to preferred features of the invention, the machine includes, behind the rotary rake and in front of the consolidating device, a hole filling device which is adapted to store a filling material; detect holes in the ground; and deposit the filling material on the ground when a hole is detected.

With these features, the machine in accordance with the invention performs a very complete operation of restoring the state of the ground, since holes remaining unfilled after the rake has passed over them are filled by the filling material, which will then be tamped down by the consolidating device.

According to further preferred features of the invention, the machine includes a roller which is disposed behind the rotary rake and in front of the consolidating device, and more precisely in front of the hole filling device if the machine has one.

After the rake has passed, the roller gives a beneficial levelling effect before any remaining holes are detected (if need be there is provision for this), and in any case before consolidation takes place.

According to other preferred features of the invention, the machine includes a device for controlling the orientation of the axis of rotation of the roller.

It is thus possible to steer the machine by the use of the control device. It would be particularly difficult, or even impossible, to steer the machine by other means such as the steering mechanism of a tractor which will typically be arranged behind the consolidating device. In addition, tearing of the grass when the machine is turned is avoided.

According to other preferred features of the invention, the machine includes driving wheels which are disposed behind the consolidating device.

With this arrangement, sinking of the driving wheels into the ground is minimized, because the ground has already been consolidated by the time the driving wheels run over it.

According to other preferred features of the invention, the machine includes, arranged at the extreme rear end, a grass dressing device, whereby the grass is restored to its original upright position which it will have lost when being tamped by the machine.

Objects, features and advantages of the invention will be described below by way of non-limiting example and with reference to the accompanying drawings.

DETAILED DESCRIPTION OF THE PREFERRED EMBODIMENT

Figure 1:
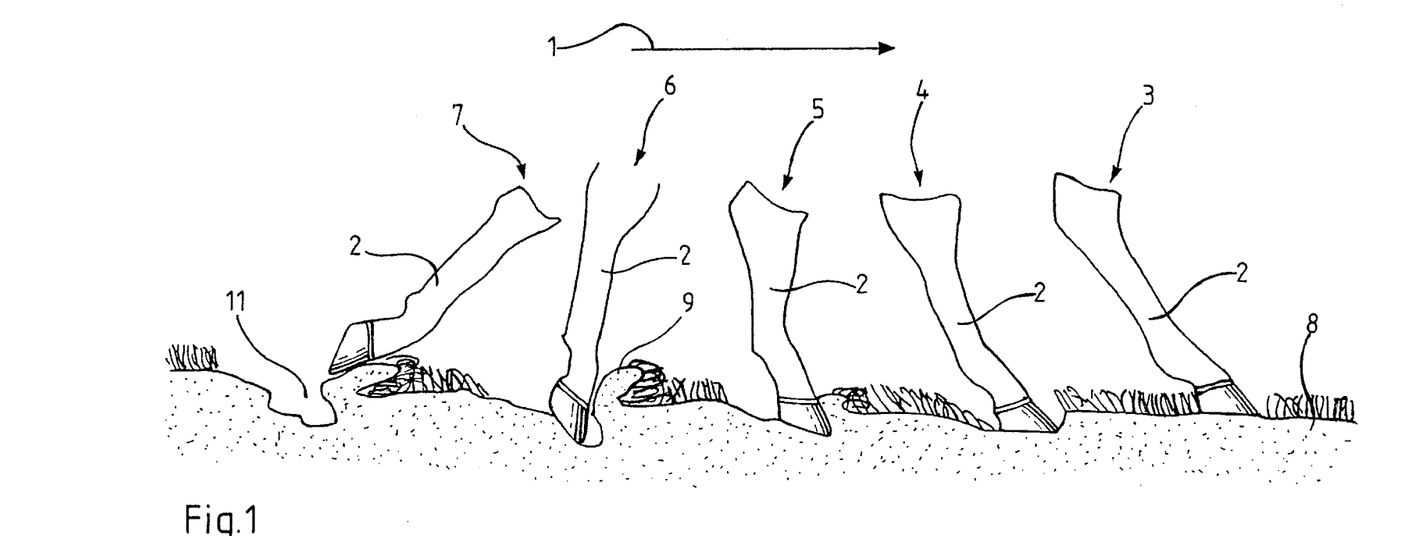
FIG. 1 is a diagram showing how horses' hooves cause damage to racecourses or training grounds.

FIG. 1 shows five successive positions 3 to 7, respectively, assumed by a hoof 2 of a horse between the moment at which it makes contact with the ground 8 of a turfed racecourse or training ground, and the moment when it separates from the ground, the horse moving from left to right, as shown by the arrow 1.

Figure 2:
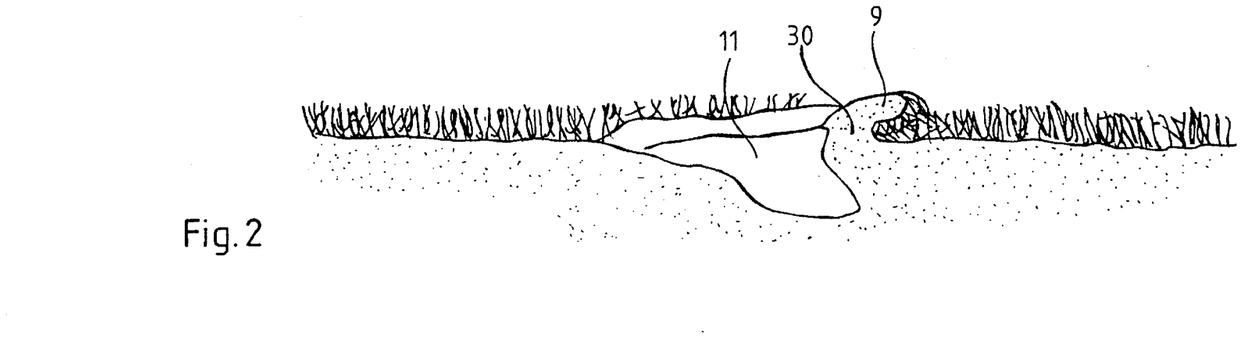
FIG. 2 shows a larger scale a hole made by a horse's hoof.

It will be seen that the ground 8 becomes pitted to the extent that the hoof 2 is applied to it and pivots on it, while at the same time a tongue of turf or soil, or divot, 9 is displaced out of the ground, and is sometimes projected forward by the horse's hoof as it is withdrawn from a hole 11 that has been created. However, the divots 9 usually remain attached to the ground, being bent forward as indicated in the position 7 in FIG. 1, and in FIGS. 2 and 3.

Figure 3:
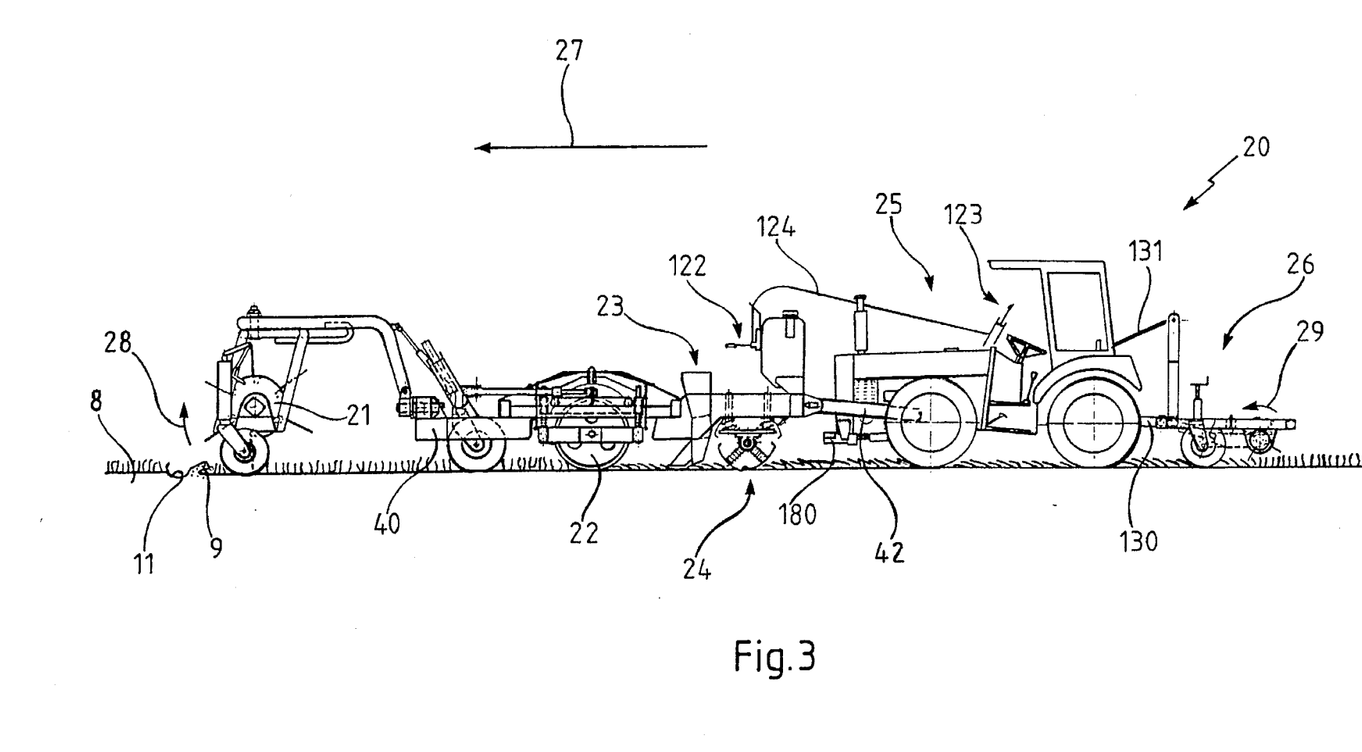
FIGS. 3 and 4 are, respectively, a side view and a top plan view, shown partly broken away, of a machine in accordance with the present invention.
Figure 4:
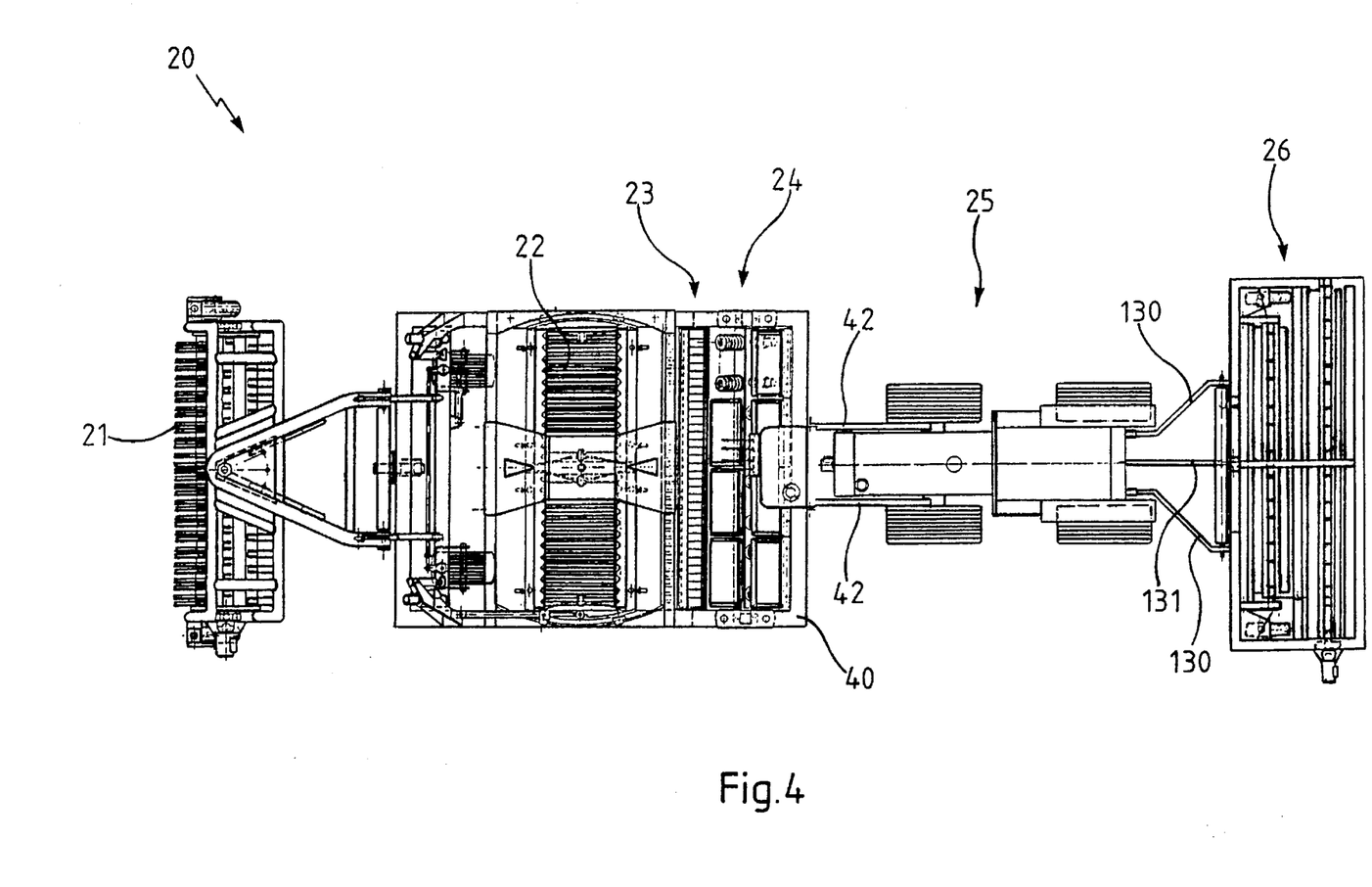

As illustrated in FIGS. 3 and 4 a machine 20 includes a rotatable rake 21 at its extreme front end, followed in succession by a roller 22, a hole filling device 23, a soil consolidating device 24, a tractor 25, and a grass dressing device 26 arranged at the extreme rear end.

The machine 20 is preferably driven so as to travel over the racecourse in the opposite direction to that in which the horses move, as indicated by the arrow 27 in FIG. 3, the rotatable rake 21 being driven so as to rotate with a forward velocity tangential to the ground, that is to say in the direction shown by the arrow 28.

Due to the forward movement of the machine 20 and the rotary motion of the rake 21, the divots 9, and in more general terms the soil displaced from the ground 8, is replaced in the holes 11 made in the latter. In particular, the divots 9 that have remained attached to the ground 8 are replaced by turning them back into the holes 11 by pivoting movement about a zone 30 (FIG. 2) by which they are attached, which acts as a kind of hinge.

The machine 20 may alternatively be so driven that is passes over the course in the same direction as that in which the horses have run (direction 1), with the rake 21 being driven in rotation with a rearward velocity tangential to the ground (i.e. in the opposite direction to the direction 28). The results thus obtained are satisfactory, but they are not as good as with the directions 27 and 28.

In this connection, when the rake 21 rotates in the direction 28, it pushes the material which does not immediately find a hole in front of it, so that this material can later be used to fill another hole. By contrast, when the rake rotates in the opposite direction, the material that does not immediately find a hole remains on the ground, so that it forms a hummock.

After the rake 21 has passed, the roller 22 levels the soil, with those holes still remaining unfilled being detected and filled by the hole filling device 23. The ground is then consolidated by the soil consolidating device 24 in such a way that the material replaced in the holes then remains in place. The grass which has been flattened by the machine passing over it, especially by the roller 22, the consolidating device 24 and the tractor 25 is then dressed, i.e. restored to its upright state, by the grass dressing device 26. The grass dressing device has two rotary combs which are driven so as to rotate with a velocity tangential to the ground that goes from front to rear as indicated by the arrow 29 in FIG. 3.

The various elements of the machine 20 will now be described in greater detail.

The part of the machine which is attached to the front of the tractor 25 (see FIGS. 5 and 6) has a rectangular chassis 40, which is provided at its rear end with lugs 41 for attachment on front lifting arms 42 (FIGS. 3 and 4) of the tractor 25. The lugs 41 are formed with oblong holes 43, so as to allow some freedom of movement for the chassis 40 with respect to the tractor 25.

Figure 5:
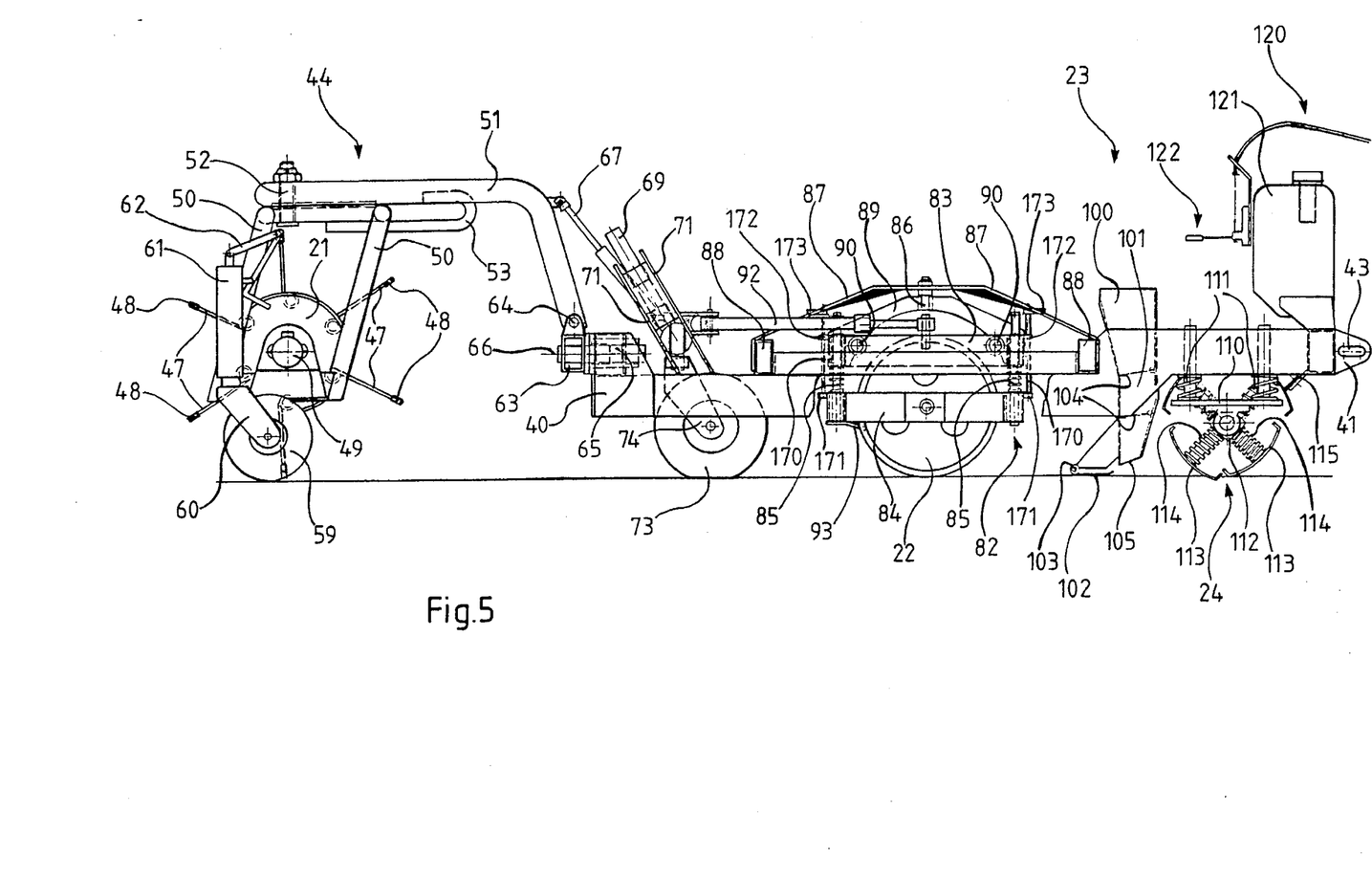
FIGS. 5 and 6 are, respectively, a side elevational view and a top plan view, on a larger scale than FIGS. 3 and 4, of that part of the machine in FIGS. 3 and 4 that is attached to the front of the tractor.
Figure 6:
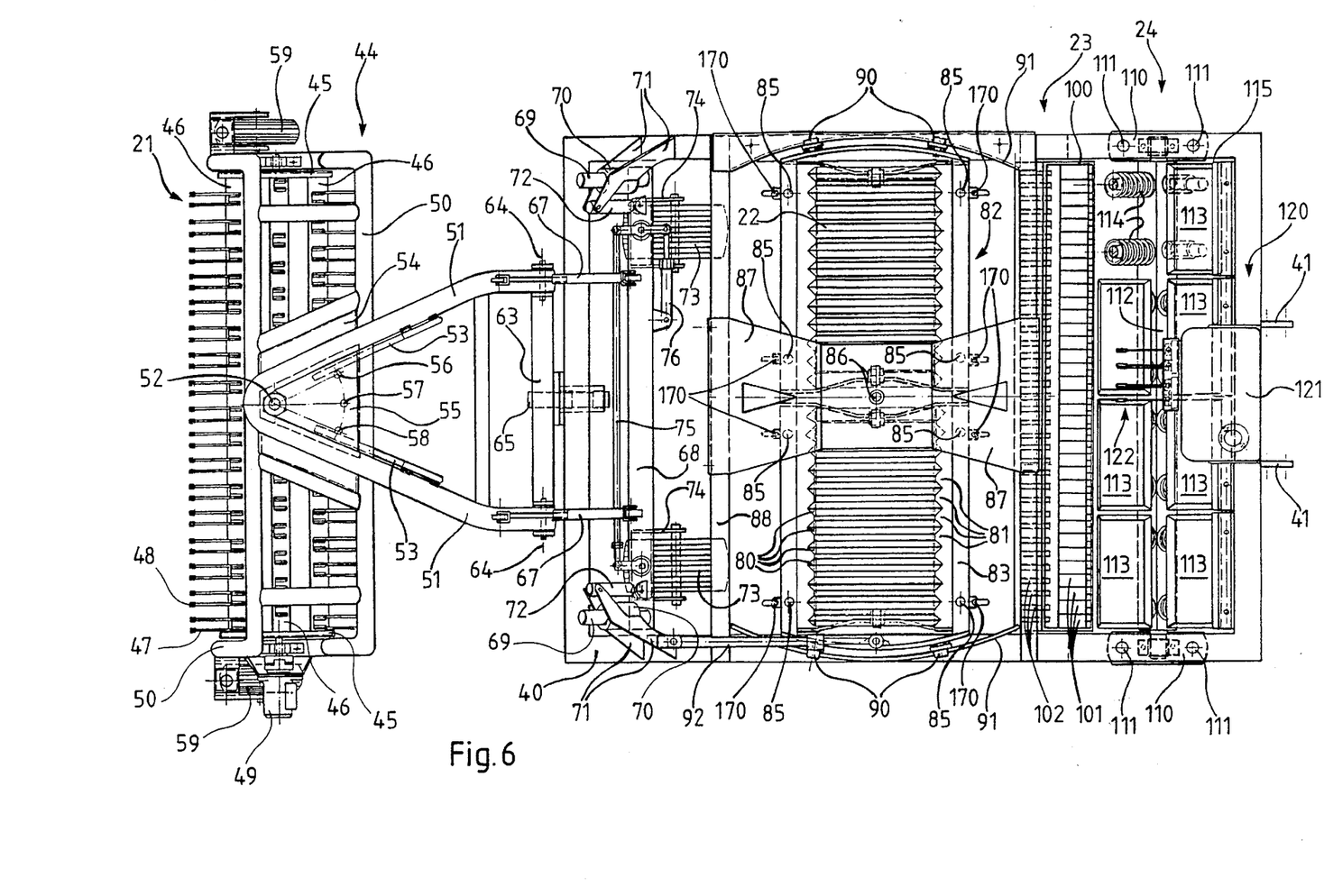

The rotary rake 21 is carried by a structure 44 which is attached to the front of the chassis 40. The rake has a central drum embodying a pair of end plates in the form of discs 45 which are joined together by means of transverse bars 46, of which there are six in this example. A set of flexible teeth 47, of a known type, is mounted on each of the transverse bars 46. Each of these teeth is a steel wire, with a spiral winding between one end, namely the end whereby it is fastened on to the drum, and a straight portion extending to the other or free end of the tooth. Each tooth is provided at its free end with a tip 48 of plastic material, the purpose of which is to prevent injury to the grass or turf.

The rotary rake 21 is driven by a hydraulic motor 49 which is coupled directly to the drum, the latter being mounted in the bearings of a double fork 50 which is itself secured to a yoke or A-frame 51 by means of a vertical pivot 52 and slides 53. The pivot 52 is located at the front end of the horizontal portion of the yoke, which is in the form of a triangle, while the portion of the double fork 50 lying between the pivot 52 and its upper rear transverse element is engaged in the slides 53. In this region, plates 54 and 55 are arranged on the double fork 50 and on the yoke 51, respectively. Three holes 56, 57 and 58 are formed in the plate 55 for cooperation with a corresponding hole in the plate 54 through which a bolt passes. When this bolt is inserted through the middle hole 57 and the hole in the plate 54, the rotary rake 21 is in the position shown in the drawing, that is to say it is maintained with its axis of rotation oriented transversely to the direction of travel of the machine. When the bolt is inserted through the right-hand hole 56 and the hole in the plate 54, the axis of rotation of the rake 21 is in oblique relationship with the direction of travel of the machine, by an angle of about 45°. If it is the third hole 58 that is used, the same is true but the inclination is of course in the opposite direction.

When the rake is oriented obliquely with respect to the direction of travel of the machine, with the rake rotating in the direction 28, any excess material (i.e. above what is needed to fill the holes) in front of the rake is pushed to one side of the machine (the right-hand side for the hole 58 and the left-hand side for the hole 56); and this excess material can be collected in an appropriate receptacle (not shown) which is arranged on one side of the machine, being equipped, for example, with a drawer having a hinged door so that it can be emptied regularly at suitable collection points.

It will, however, be noted that, on equestrian sites, the best results are generally obtained with the configuration shown, in which the axis of rotation of the rake is transverse to the direction of movement of the machine.

A ground wheel 59 is provided at each side of the double fork 50. Each ground wheel 59 is mounted in a caster which constitutes a fork 60, the upper end of which is free to pivot about a vertical axis, with each fork 60 being mounted at the base of a jack-type device 61 which is secured on a respective front riser of the double fork 50, so that the working height of the rake 21 can be adjusted by means of a handle 62.

The structure 44 also includes a swingle or crossbar 63. The yoke 51 is mounted by the ends of the swingle bar 63, for pivoting movement about an axis 64 parallel to the general direction of the crossbar, that is to say transversely to the direction of travel of the machine. The swingle bar is itself articulated at its center with respect to the chassis 40, by means of a horizontal pivot 65 which is oriented in the longitudinal plane of symmetry of the chassis 40. With this arrangement, the rotary rake 21 is able to oscillate about a roll axis 66 corresponding to that of the pivot 65, as well as about the pitch axis 64.

Two dampers 67 are provided for the purpose of limiting pitching and rolling motion. Each damper 67 is disposed between one of the risers of the yoke 51 and a transverse beam 68 which is mounted for up and down sliding movement with respect to the chassis 40. A solid cylindrical bar 69, which is welded to each end of the beam 68, slides in a sleeve 70 which is fixed to a pair of cheek plates 71 welded on to the chassis 40. A jack 72 is arranged in parallel with the solid cylindrical bar 69 and sleeve 70, again between the cheek plates 71 and the beam 68, so as to control the height of the beam with respect to the chassis 40.

Figure 9:
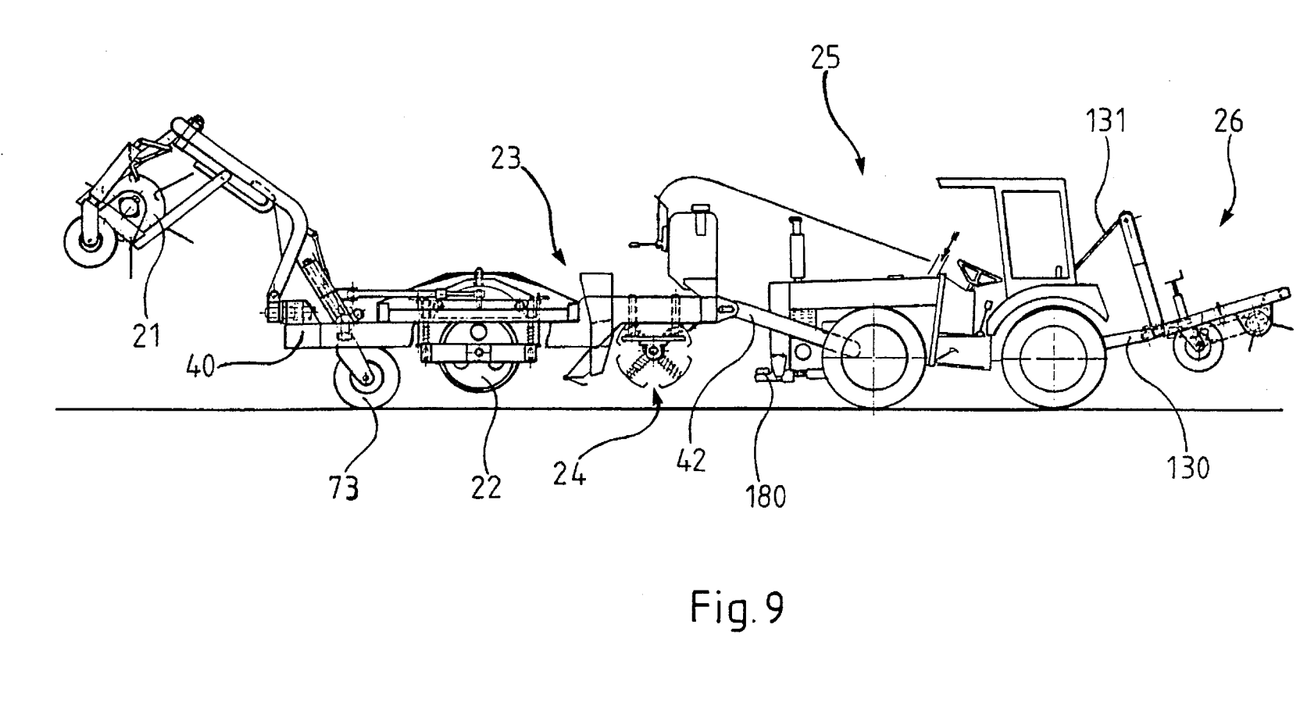
FIGS. 9 and 10 are views similar to FIGS. 3 and 5, respectively, but showing the machine in its transport position.
Figure 10:
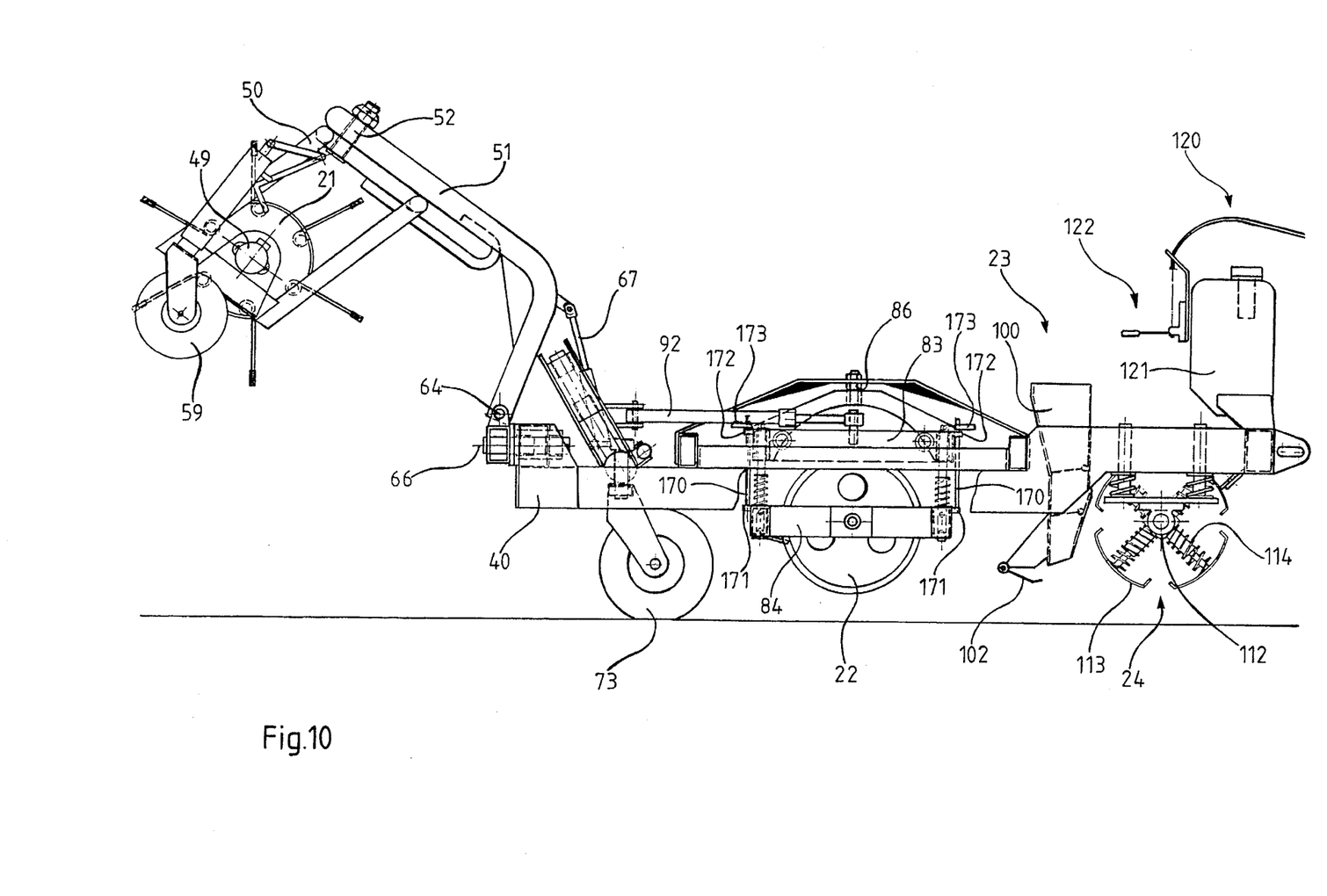

When the rams of the jacks 70 are extended, the beam 68 is lowered with respect to the chassis 40, with the dampers 67 extending to their fullest extent; and when the beam 68 continues to descend, the yoke 51 pivots about the pivot axis 65, which raises the rotary rake 21 as shown in FIGS. 9 and 10.

It will be observed that the cheek plates 71 are inclined forward, for space saving reasons.

A system of two steerable wheels 73 is also mounted on the beam 68. Each of these two wheels 73 is mounted in a fork 74, which is itself mounted for pivoting movement about a vertical axis on the beam 68. The two forks 74 are joined together by a rod 75 which cooperates at each end with a crank connected to the corresponding fork 74, the crank corresponding to the right-hand wheel 73 being double. This crank is coupled to the ram of a jack 76, the body of which is connected to the beam 68, so that it is possible to control the orientation of the axis of rotation of the steerable wheels 73 using the jack 76.

The wheels 73 serve for adjustment of the height of that part of the machine which is in front of, and propelled by, the tractor 25. This propelled, or pushed, part is partly supported by the wheels 73 when in the working position (FIGS. 3 to 6). In the transport position of the machine shown in FIGS. 9 and 10, the propelled part of the machine is supported by the wheels 73 and carried by the front lifting arms 42 of the tractor.

The roller 22 has a closed ground contact surface, that is to say this surface has no apertures through which soil could penetrate into the interior of the roller. This surface does, however, have a regular succession of annular lands 80 alternating with annular grooves 81, as can be seen in FIG. 6.

The roller 22 is mounted on a sub-frame 82 which embodies two sections 83 and 84 one above the other, namely a lower section 84 in which the roller 22 is mounted for free rotation, and an upper section 83 which cooperates with the chassis 40. The upper and lower sections 83 and 84 are joined together by means of dampers 85, of which there are eight in this example. The sub-frame 82, and more precisely its upper section 83, is articulated at its center, which corresponds to the center of the roller 22, about a vertical pivot 86 carried by the chassis 40. Reinforced support plates 87, carried by transverse stretchers 88, are provided on the chassis for supporting the pivot 86, the pivot 86 being secured to the upper section 83 of the sub-frame by means of yoke plates 89.

The sub-frame 82, and more precisely its upper section 83, is provided on each side with two rollers 90 which cooperate with a rollway 91 on the chassis 40. The rollway 91 describes part of a circle concentric with the roller 22, and therefore also with the pivot 86. With this arrangement it is possible to vary the orientation of the axis of rotation of the roller 22 with respect to the chassis 40. A further jack 92 is provided so that this orientation can be controlled. In this example the ram of the jack 92 is connected to the sub-frame 82 (i.e. to the upper section 83 of the latter), while the body of the same jack is secured to the cheek plates 71.

A mud scraper 93, the shape of which matches the lands and grooves 80 and 81 of the roller 22, is provided for removing grass and soil residues which may become stuck to the roller, and which may in particular collect in the grooves 81, even though the shape of the ground contact surface of the roller does minimize the adherence of these residues.

The dampers 85 are fully flexible, their essential function being to provide vertical sliding mounting of the roller 22 with respect to the chassis 40. The springs of these dampers are provided simply so as to prevent severe impacts occurring between the upper and lower sections 83 and 84 of the sub-frame.

Because it is suspended in this way, the roller 22 is subject to hardly any force transmitted from the chassis 40 in the working position, so that the force which the roller exerts on the ground is essentially that which is due to its own weight. Its levelling effect on the ground is consequently essentially that due only to the weight of the roller, which is relatively light so as to prevent damage to the turf.

Besides having its levelling function, the roller 22 also plays a part in the steering of the machine 20, by operation of the jack 92. Being steered in this way, the machine 20 is able to turn quite sharply despite its considerable length, and without the roller 22 performing any translation movement parallel to its axis of rotation. Any such translation movement would result in tearing of the grass or turf.

The other steering system, with its wheels 73, is, however, also useful in the transport position of the machine shown in FIGS. 9 and 10, in which the part of the machine ahead of the tractor 25 rests on the wheels 73.

In the example, shown, the wheels 73 are of simple form, each being a single wheel; but in modified embodiments not shown, suitable for applications in which the ground to be repaired is softer, the wheels 73 are replaced by double or even triple wheels.

In the example shown, the roller 22 is caused to rotate simply because it is in contact with the ground, being mounted for free rotation; however, in a modified embodiment not shown, it is positively driven, for example by means of a synchronized motor, in such a way that the roller 22 has a tangential velocity which is equal to the forward speed of the machine. This modified embodiment is valuable especially in the situation in which the roller 22 might tend to slide on the ground without rolling.

The hole filling device 23 embodies a hopper 100 which is open at the bottom through a large number of chutes 101. Corresponding to each one of these chutes is a feeler member 102 in the form of an elongated shoe, which is disposed longitudinally in front of the associated chute 101. Each shoe 102 is pivoted at its front end 103 with a spring, such that the shoe 102 tends to rotate about the pivot at its front end so as to lie in continuous contact with the ground.

When a shoe 102 passes over an unfilled hole, it pivots about the pivot at its front end, which causes traps 104 to open so that the filling material flows through a lower aperture 105 of the associated chute 101, this material then filling the hole which has been detected by the feeler member or shoe 102. In the example shown, the filling material is in the form of turves, or sods of soil with grass growing on each one, so that after a hole has been filled, its site is directly covered with grass. As can be seen in FIG. 6, the chutes 101 and the feeler members 102 are relatively narrow, which enables a narrow hole to be detected and filled. For holes of substantial width, there will be several feeler members 102 that open the traps 104, and the hole is filled with several sods of turf. The arrangement of the chutes is thus such that all of the holes are filled.

The consolidating device 24 has the general shape of a cylinder, and is mounted for free rotation on the chassis 40, and more precisely on plates 110 which are connected to the chassis 40 itself, through dampers 111 which are adjustable for height. The consolidating device 24 is composed of a central shaft 112, which in this example has a square cross section, together with peripheral tamping shoes 113, each of which is connected to the shaft 112 by means of at least one spoke 114. In this example each shoe 113 has two of these spokes. The spokes are resilient in the axial direction, and in this example each spoke is two elements constituting a telescopic assembly, together with a spring exerting an outward radial biasing force on the associated shoe. The shoes 113 are associated with each other in a plurality of sets, as can be seen in FIG. 6, with each set including several shoes. Here, there are four sets, each of four shoes.

When a tamping shoe 113 comes into contact with the ground, for example the shoe seen at the bottom left in FIG. 5, the spoke or spokes 114 by which it is carried is or are extended. Then as the machine advances, that is to say the rotary consolidating device turns, the spokes 114 become compressed so as to increase the force applied to the ground. This force reaches a maximum value when the spokes are vertical, and then decreases until the shoe parts company with the ground, so that the tamping motion which is conventionally carried out by tamping the ground with a tamping device moved in an alternating vertical motion is reproduced, but with the benefit of flexibility and without there being any need for the consolidating device to be a powered tool.

A mud scraper 115, here a strip of strong rubber, is provided for cleaning the tamping shoes 113.

It is preferable that each set of tamping shoes should consist of a plurality of shoes, because in this way the consolidating operation is prevented from being upset by the contours of the ground; in particular, the situation is avoided in which an isolated hummock prevents proper consolidation over the whole width of the machine.

The dampers 111 are relatively rigid, so that in the working position, the assembly of which the chassis 40 forms the skeleton is supported by the consolidating device 24 and by the wheels 73. A vertical load is thereby applied on the consolidating device 24, which enables the latter to carry out its consolidating function.

In the working position, the front lifting or support arms 42 of the tractor serve simply to push the chassis 40, and not to support part of its weight on the tractor 25: each of the lifting arms 42 is actuated by a simple jack which does not act in the working position. In order to change to the transport position shown in FIGS. 9 and 10, these jacks are operated so as to lift the support arms 42, and the jacks 72 are operated so as to lower the wheels 73, the chassis 40 being then supported at the front by the wheels 73 and carried at the rear by the support arms 42.

In the transport position, the consolidating device 24 is not in contact with the ground, but is suspended from the chassis 40 by means of the dampers 111 (a transverse support pin or trunnion is arranged at the top of the ram of each damper 111, with each support pin bearing on the top of the chassis 40). The roller 22 is also out of contact with the ground, being suspended from the chassis 40, and more precisely from the upper section 83 of the sub-frame 82, because means are provided for limiting the maximum lowering of the roller 22 with respect to the chassis 40. In this example, the limiting means are screws 170, each of which is disposed parallel to a damper 85°. The threaded ram of the damper 85 cooperates with a nut 171 fixed to the lower section 84. The free end of the ram slides in an eye 172 fixed to the upper section 83. The roller 22 can be lowered with respect to the chassis 40, until the head 173 of the screw 170 meets the eye 172 (see FIG. 10). By rotating the screws 170, it is possible to adjust the maximum amount by which the roller 22 can be lowered, according to the ground which is being worked, and even to neutralize the action of the roller 22 in the working position. If the screws 170 are rotated by a large enough amount, the roller 22 ends up being suspended from the chassis 40 without being in contact with the ground at all, even through the part of the machine 20 which is situated in front of the tractor 25 remains in its working position.

In the case wherein the roller 22 is out of contact with the ground in this way, the machine is steered in its working position by means of the wheels 73.

In a modification not shown, the maximum amount by which the roller 22 can be lowered is limited by means of jacks rather than the screws 170.

In the example shown, the consolidating device 24 is set in rotation simply because it is in contact with the ground, being mounted for free rotation. However, in a modified version (not shown) it is driven positively, for example by a synchronized motor, in such a way that the consolidating device 24 has a tangential velocity equal to the forward speed of the machine. This modified version is especially useful under circumstances in which the consolidating device 24 may tend to slide on the ground without rolling.

The rear end of the leading part of the machine, partly carried by the tractor 25 and propelled in front of the latter, is provided with a hydraulic system 120 (FIGS. 5, 6 and 10). The hydraulic system 120 includes on oil reservoir 121 which is connected to a pump 180 (FIG. 9). The pump 180 is connected to the power take-off of the tractor 25. The system also includes a group of four control levers 122, one of which is provided for starting and controlling the speed of the drive motor 49 of the rotary rake 21, while a second lever controls the jack 76, that is to say the steering system for the wheels 73. The third lever controls the jack 92, that is to say the steering means for the roller 22, while the fourth lever controls the jack 72, that is to say the height of the beam 68, and in particular the change from the working position shown in FIGS. 3 to 6 to the transport position shown in FIGS. 9 and 10.

The tractor 25 is an articulated tractor of a well known type used for green field work. It is provided with a group of levers 123 similar to the group of levers 122, to which the group 123 is connected through flexible control cables 124 (see FIG. 3), so that the driver of the tractor is able to control the part of the machine in front of the tractor from his seat.

The grass dressing device 26 is attached in the usual way to the rear of the tractor 25 by means of a tripod type tow bar system having two lower towing arms 130 and an upper towing arm 131 (FIG. 3). The towing arms 130 cooperate with a swingle or crossbar 132, FIG. 8, which is articulated at its center to a frame 134, by means of a horizontal pivot 133 which is disposed in the plane of symmetry of the machine. The upper towing arm 131 cooperates with a post 135 which is arranged at the center of the leading cross member of the frame 134.

Figure 7:
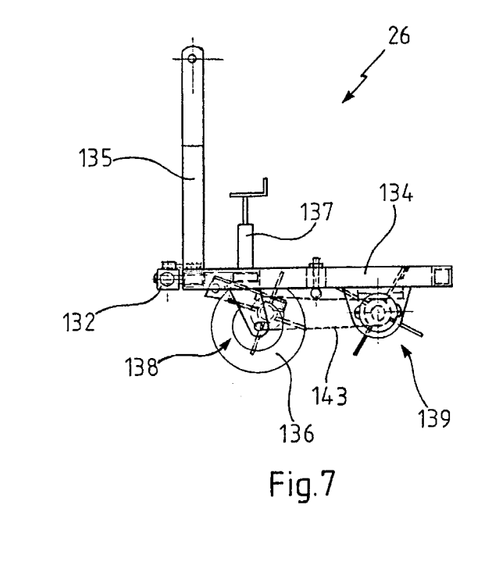
FIGS. 7 and 8 are, respectively, a side elevational view and a top plane view, on a larger scale still, showing the grass dressing device of the machine in FIGS. 3 and 4, which is attached to the rear of the tractor.
Figure 8:
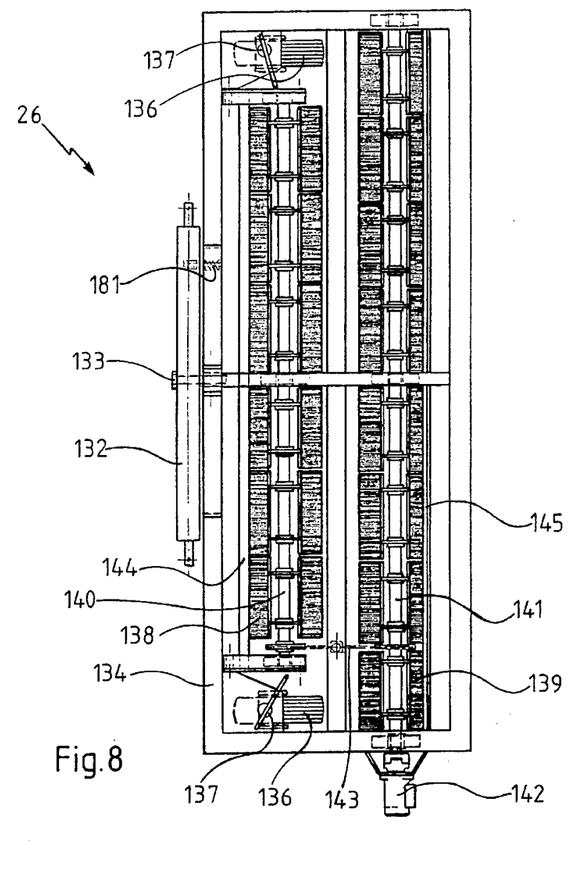

The grass dressing device 26 is supported by wheels 136, each of which is arranged in a caster like the wheels 59, with each caster constituting a fork 137 which includes in its upper part a hand wheel or the like, for adjusting the height of the wheels 136.

In the transport position, the grass dressing device 26 is raised (see FIG. 9) in the usual way which is well known for tripod towing attachments, after the swingle bar 132 has been secured in line with the frame 134 by means of a suitable device 181 (see FIG. 8).

Two rotary combs, 138 and 139 respectively, are disposed one behind the other. Each of these combs is composed of a central shaft 140 and 141, each carrying several sets (in this example four) of fiber brushes made of plastic material. The combs 138 and 139 are driven in rotation by a hydraulic motor 142 which is connected to the central hydraulic power source of the tractor 25, the motor 142 being coupled directly to the shaft 141. A chain and sprocket transmission 143 couples the shafts 141 and 140 together. Vibrating bars 144 and 145 are provided for cleaning the combs 138 and 139 respectively, so as to remove any grass fragments which may become caught up in the fiber brushes of the combs.

In a modified version not shown, the comb 138 is provided with brushes only on that portion which lies behind the tractor wheels 25, and is arranged at a lower level than the comb 139. In this way it provides the additional function of dressing the grass upright which complements that of the comb 139, being in exact alignment with the wheels of the tractor 25 so that the grass is restored to its upright position where it has been flattened by the tractor wheels.

In the example shown, the comb 138 also includes fiber brushes on either side of the tractor wheels, but it is of shorter width than the rotary comb 139.

In another modified version not shown, the grass dressing device has only one rotary comb.

In a further modified version, again not shown, the grass dressing device 26 has its own central hydraulic power source, the pump of which is connected to the power take-off of the tractor.

Figure 11:
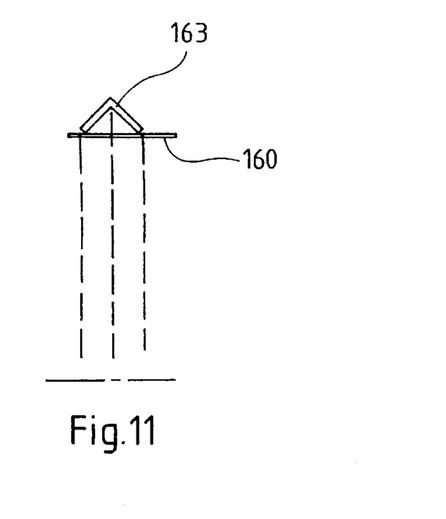
FIG. 11 shows elements which are components of the roller which is part of the machine.

The construction of the roller 22 will now be described in greater detail. As can be seen in FIG. 11, the roller 22 embodies a hollow drum 160, on which a regular succession of rings 163 (only one of which is shown) are mounted. Each of these rings is made from an angle iron section. In the modified form shown in FIG. 12 the rings, here indicated by the numeral 161, are made of corrugated sheet metal; while in the further embodiment shown in FIG. 13, the rings, here denoted by 162, are made from flat sheet metal which is worked so as to give it the form shown.

Figure 14:
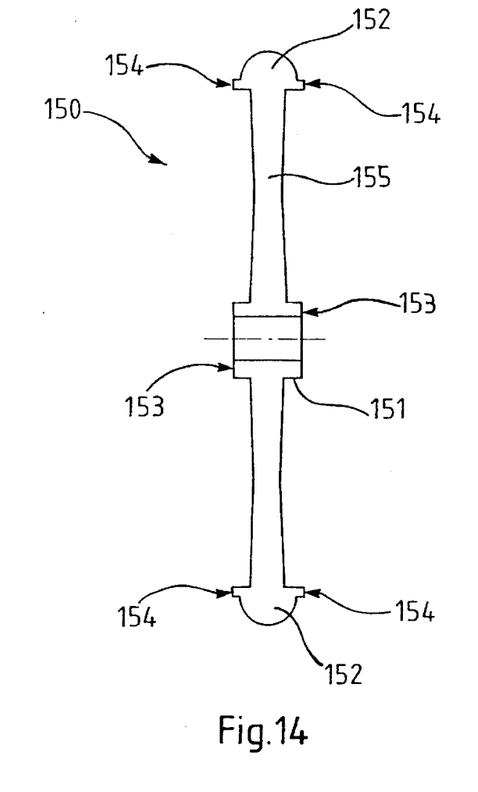
FIG. 14 shows one of the discs forming part of one modified version of the roller.

In the version which is shown in FIG. 14, the roller is an assembly of discs 150, one of which is shown in FIG. 14. These discs are mounted on a common central shaft and are held in clamped relationship with each other. The disc 150 has a central hub 151 with a bore corresponding to the diameter of the common central shaft, a peripheral felly or rim portion 152, and a radial web 155, the radial web being narrower than the hub and the rim portion and joining the hub and rim portion together. When the discs 150 are mounted on the central shaft, they bear against each other through radial surfaces 154 of the rim portions 152, and through radial surfaces 153 of the hub 151, the surfaces 153 and 154 being coplanar on each side.

Figure 12:
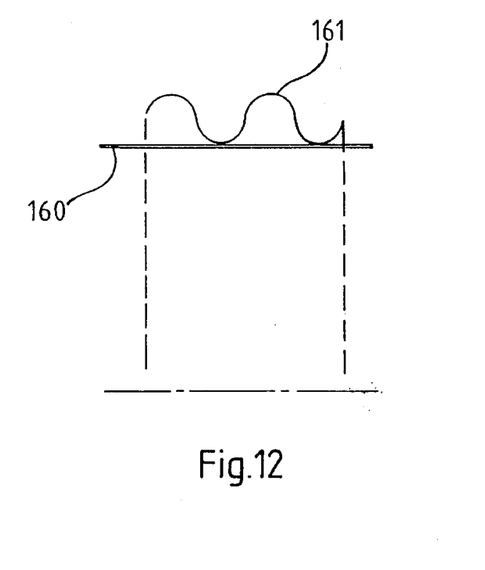
FIGS. 12 and 13 show modified versions of the elements of FIG. 11.
Figure 13:
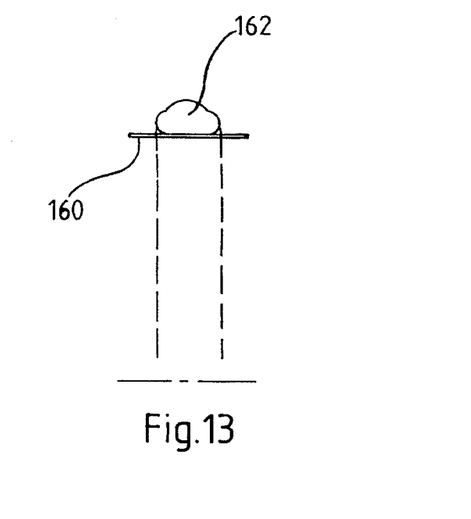

Various profiles may be adopted for the lands and grooves of the roller. It can, for example, be seen that the roller with the discs 150 has relatively wide rounded lands with relatively narrow, flat bottomed annular grooves, while the roller which is made as shown in FIG. 12 has a surface for contact with the ground which has a succession of rounded lands and grooves of the same width. The roller made in accordance with FIG. 13 has lands with three rounded portions, while the roller which is made as shown in FIG. 11 has lands of triangular cross section, that is to say with a narrow edge at the apex.

The ground contact surface of the roller, being closed and defining a regular succession of annular lands and grooves, enables the roller to perform its levelling function under the best conditions. The closed nature of the roller prevents the interior of the roller from becoming filled with soil and the regular succession of lands and grooves enables the tongues of soil to be flattened, a little like conventional turf rollers but without exerting the heavy pressure which is applied by the conventional turf rollers which can be harmful to the ground that is being worked.

In addition, this succession of lands and hollows gives the roller some degree of grip in the ground, which facilitates its function in the steering of the machine, this succession at the same time preventing grass and soil residues from accumulating on the roller. In addition, after the machine has passed over the ground, the ground is marked with discrete grooves which enables the driver of the machine to recognize the areas which have already been treated by the machine.

The machine shown is, as already mentioned, especially designed for the repair of racecourses or equestrian training grounds. Its width is three meters, so that it can traverse the whole of the course in three passes, since racecourses are generally nine meters wide. In a modification not shown, the machine is itself nine meters wide, so that a racecourse can be repaired in a single pass.

According to the number of hydraulic distributors on the tractor, it is possible to use the central hydraulic power source of the tractor directly for supplying the propelled, or leading, part of the machine which is carried partly by the front of the tractor, in addition to the provision of the hydraulic system 120.

In the example shown, the driving wheels which are used to propel the machine are those of the tractor 25, but in modified versions it is possible to provide a self-propelled machine, in which the tractor is replaced by a set of driving wheels.

Although the machine 20 is designed especially for the repair of equestrian racecourses, it gives quite satisfactory results on other terrains used for sporting purposes, for example football or rugby pitches, golf courses or polo fields. It can also be of value in pastures or prairies, for the purpose of filling the holes which can sometimes cause animals at pasture to fall and become injured.

In a modified version, not shown, of the hole filling device, the system having mechanical feeler members or shoes 102 is replaced by an electronic eye which detects the presence of holes, and acts on a control means for depositing filling material in the hole which has been detected. This material may also consist of sand or loose soil, which may be mixed with grass seed.

It will be noted that, according to the circumstances, the rotary rake, the roller, the hole filling device, the consolidating device and the grass dressing device may be used as individual machines. It is, for example, possible to use the rotary rake by itself to fill holes rapidly and simply between two passes, without any tamping.

It will also be noted that the system which enables the rotary rake 21 to be raised at the same time as the wheels 73 are lowered, can be used in machines other than the machine 20.

Finally, it will be noted that the mounting system for the roller 22 may be used in other machines, and in particular in a long machine which is arranged to be pushed, and in which the roller may be in a different form, having for example a soft surface for contact with the ground.

As already mentioned, the scope of the invention is not to be limited to the embodiments described above and shown in the drawings, but is to be limited only by the following claims.

What is claimed is:

1. A method of repairing divots and holes in a turf covered ground area, said method comprising the steps of:

determining a first predetermined direction of travel with respect to said turf covered ground area;

raking said turf covered ground area in a direction substantially the same as said first predetermined direction of travel with a vehicle having a rotary rake having a periphery that contacts said turf covered ground area, said rotary rake mounted to the extreme front end of said vehicle; and rolling a drum mounted to said vehicle over said turf covered ground area to flatten and consolidate said turf covered ground area, said drum being mounted to said vehicle behind said rotary rake.

2. The method according to claim 1 further comprising the steps of:

sensing said holes in said turf covered ground area with a sensing device mounted to said vehicle;

filling said holes in said turf covered ground area with soil;

tamping said turf covered ground area such that said soil filled into said holes is level with said turf covered ground area; and dressing said turf covered ground area using a dressing rake mounted to said vehicle such that the turf of said turf covered ground area is in a substantially upstanding position.

3. The method according to claim 2 wherein said sensing step comprises the steps of:

providing a finger-like projection pivoted at a given point;

biasing said finger-like projection to contact said turf covered ground area; and moving said finger-like projection over said turf covered ground area in a direction substantially the same as said first predetermined direction of travel.

4. The method according to claim 1 further comprising the step of:

rotating said rotary rake such that said periphery of said rotary rake adjacent said turf covered ground area has a velocity tangential with respect to said turf covered ground area in a direction that is substantially the same as said first predetermined direction of travel.

5. The method according to claim 1, further comprising the step of:

rotating said rotary rake such that said periphery of said rotary rake adjacent said turf covered ground area has a velocity tangential with respect to said turf covered ground area in a direction that is substantially opposite said first predetermined direction of travel.

6. A machine for repairing a ground area planted with grass and adapted to travel over said ground area for the purpose of filling holes formed in said ground area, said machine comprising:

a wheeled frame member having a front end and a rear end;

a rotary rake arranged at the extreme of said front end of said wheeled frame member for filling said holes in said ground area; and a ground consolidating device connected to said wheeled frame member behind said rotary rake.

7. The machine of claim 6 further comprising:

means attached to said wheeled frame member for sensing said holes in said ground area;

means attached to said wheeled frame member and spaced a predetermined distance from said sensing means for filling said holes in said ground area with soil, said filling means communicating with said sensing means;

tamping means attached to and proximate said rear end of said wheeled frame member for tamping said soil in said holes; and means attached to said wheeled frame member for dressing said grass planted in said ground area such that said grass is in a substantially upright position.

8. The machine of claim 7 wherein said machine further comprises:

an A-frame member having a first end and a base end connected to said front end of said wheeled frame member and wherein said rotary rake is connected to said first end of said A-frame member.

9. The machine of claim 6 wherein said ground consolidating device is a drum.

10. The machine of claim 9 wherein said drum has a first predetermined diameter and a second predetermined diameter greater than said first predetermined diameter.

11. A machine for repairing divots and filling holes in a ground area planted with grass, said machine comprising:

a wheeled frame member having a front end and a rear end;

a rake member connected to said front end of said wheeled frame member;

a hole sensor attached to said wheeled frame member and spaced apart from said rake member, said sensor providing a signal when a hole is sensed;

a hole filling device attached to said wheeled frame member and spaced a predetermined distance from said hole sensor, said hole filling device connected to said hole sensor; and a tamper connected to said wheeled frame member proximate said rear end of said wheeled frame member and aligned with said hole filling device.

12. The machine of claim 11 further comprising:

a dressing device spaced a fixed distance from said wheeled frame member, said dressing device adapted to dress said grass planted in said ground area such that said grass is in a substantially upright position; and a drum roller attached to said wheeled frame member and spaced apart from said rake member for consolidating said ground area.

13. The machine of claim 12 further comprising a hopper communicatively attached to said hole filling device for storing filling material.

14. The machine of claim 12 wherein said rake member is a rotary rake adapted to replace said divots in said ground area.

15. The machine of claim 12 further comprising:

an A-frame member having a first end and a base end connected to said front end of said wheeled frame member and wherein said rake member is a rotary rake connected to said first end of said A-frame member.

16. The machine of claim 12 wherein said drum roller has a first predetermined diameter and a second predetermined diameter greater than said first predetermined diameter, such that said drum roller has a series of alternating first predetermined diameters and second predetermined diameters.

17. A method of repairing divots and holes created by a horse in a turf covered ground area used for equestrian events such as training or racing horses, said method comprising the steps of:

determining a first predetermined direction of travel with respect to said turf covered ground area for a machine to repair said divots;

raking said turf covered ground area in a direction substantially the same as said first predetermined direction of travel of said machine with a rotary rake mounted to the extreme front end thereof; and rolling a drum mounted to said machine over said turf covered ground area to flatten and consolidate said turf covered ground area, said drum being mounted to said machine behind said rotary rake.

18. The method according to claim 17 wherein said first predetermined direction of travel is determined to substantially coincide with the direction said horses travel over said turf covered ground area and wherein said method further comprises the steps of:

selecting a rotary rake having a longitudinal axis of rotation and a plurality of tips spaced from said axis of rotation;

mounting said rotary rake at said extreme front end of said machine; and rotating said rotary rake in a direction such that said tips of said rotary rake have a velocity tangential with respect to said turfed covered ground area in a direction substantially opposite said first predetermined direction of travel.

19. The method according to claim 18 further comprising the steps of:

sensing said holes in said turf covered ground area with a sensing device mounted to said machine;

filling said holes in said turf covered ground area with soil;

tamping said turf covered ground area such that said soil filled into said holes is level with said turf covered ground area; and dressing the turf of said turf covered ground area using a dressing rake mounted to said machine such that said turf is in a substantially upstanding position.

20. The method according to claim 19 further comprising the steps of:

sensing said holes in said turf covered ground area with a sensing device mounted to said machine;

filling said holes in said turf covered ground area with soil;

tamping said turf covered ground area such that said soil filled into said holes is level with said turf covered ground area; and dressing the turf of said turf covered ground area using a dressing rake mounted to said machine such that said turf is in a substantially upstanding position.

21. The method according to claim 17 wherein said first predetermined direction of travel is determined to substantially be opposite the direction said horses travel over said turf covered ground area and wherein said method further comprises the steps of:

selecting a rotary rake having a longitudinal axis of rotation and a plurality of tips spaced from said axis of rotation;

mounting said rotary rake at said extreme front end of said vehicle; and rotating said rotary rake in a direction such that said tips of said rotary rake have a velocity tangential with respect to said turf covered ground area in a direction substantially the same as said first predetermined direction of travel.

* * * * *

UNITED STATES PATENT AND TRADEMARK OFFICE
CERTIFICATE OF CORRECTION

PATENT NO.   : 5,464,066
DATED        : November 7, 1995
INVENTOR(S)  : Bernard Doucet It is certified that error appears in the above-indentified patent and that said Letters Patent is hereby corrected as shown below:

Column 3, line 29, after "shows" insert ---- on ----.

Column 3, line 38, delete "plane" insert ---- plan ----.

Column 8, line 64, delete "85°." insert ---- 85. ----.

Column 9, line 9, delete "through" insert ---- though ----.

Column 9, line 30, delete "on" insert ---- an ----.

Column 12, line 49, delete "1," insert ---- 1 ----.

Column 14, line 27, delete "turfed" insert ---- turf ----.

Signed and Sealed this

Twenty-sixth Day of March, 1996

Attest:

BRUCE LEHMAN

*Attesting Officer*    *Commissioner of Patents and Trademarks*